United States Patent
Hong et al.

(10) Patent No.: US 9,954,657 B2
(45) Date of Patent: Apr. 24, 2018

(54) METHOD AND APPARATUS FOR ESTIMATING CHANNEL INFORMATION

(71) Applicant: Samsung Electronics Co., Ltd, Gyeonggi-do (KR)

(72) Inventors: Sungnam Hong, Gyeonggi-do (KR); Min Sagong, Gyeonggi-do (KR); Chiwoo Lim, Gyeonggi-do (KR); Kyungwhoon Cheun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 14/912,063

(22) PCT Filed: Aug. 14, 2014

(86) PCT No.: PCT/KR2014/007560
§ 371 (c)(1),
(2) Date: Feb. 12, 2016

(87) PCT Pub. No.: WO2015/023140
PCT Pub. Date: Feb. 19, 2015

(65) Prior Publication Data
US 2016/0191214 A1    Jun. 30, 2016

(30) Foreign Application Priority Data
Aug. 14, 2013 (KR) .................... 10-2013-0096299

(51) Int. Cl.
*H04L 5/00* (2006.01)
*H04L 27/34* (2006.01)
(Continued)

(52) U.S. Cl.
CPC ........... *H04L 5/001* (2013.01); *H04B 17/345* (2015.01); *H04L 25/00* (2013.01);
(Continued)

(58) Field of Classification Search
None
See application file for complete search history.

(56) References Cited

U.S. PATENT DOCUMENTS

2002/0021715 A1* 2/2002 Matheus ............. H04L 27/2657
370/480
2005/0282500 A1* 12/2005 Wang ..................... H04L 1/20
455/67.13
(Continued)

FOREIGN PATENT DOCUMENTS

EP    1499059 A1    1/2005
KR    10-2014-0096559    8/2014
(Continued)

OTHER PUBLICATIONS

International Search Report dated Dec. 2, 2014 in connection with International Patent Application No. PCT/KR2014/007560, 3 pages.
(Continued)

*Primary Examiner* — Andrew Lai
*Assistant Examiner* — Jamaal R Henson

(57) ABSTRACT

Disclosed are a method and an apparatus for estimating channel information. A terminal estimates a channel coefficient for each of subcarriers included in each symbol of the received signals, calculates power of the received signal matched to each of the subcarriers, calculates an interference estimation parameter for each of the subcarriers based on the power of the received signal matched to each of the subcarriers and based on power of a channel coefficient for a subcarrier on which the received signal has maximum power among the subcarriers, and calculates a non-Gaussian characteristic parameter of an interference signal related to the received signals based on the interference estimation parameters calculated for the subcarriers of all the symbols of the received signals.

24 Claims, 8 Drawing Sheets

(51) Int. Cl.
  *H04L 27/10*  (2006.01)
  *H04L 25/00*  (2006.01)
  *H04L 27/00*  (2006.01)
  *H04L 25/02*  (2006.01)
  *H04L 27/26*  (2006.01)
  *H04W 24/10*  (2009.01)
  *H04L 25/06*  (2006.01)
  *H04B 17/345* (2015.01)

(52) U.S. Cl.
  CPC ........ *H04L 25/0204* (2013.01); *H04L 25/067* (2013.01); *H04L 27/0008* (2013.01); *H04L 27/106* (2013.01); *H04L 27/2691* (2013.01); *H04L 27/34* (2013.01); *H04W 24/10* (2013.01); *H04L 5/0007* (2013.01)

(56) References Cited

U.S. PATENT DOCUMENTS

| | | |
|---|---|---|
| 2006/0264231 A1 | 11/2006 | Zhang et al. |
| 2006/0276215 A1 | 12/2006 | Lozano et al. |
| 2011/0142179 A1* | 6/2011 | Cheun ............... H04L 25/067 |
| | | 375/341 |
| 2011/0255582 A1* | 10/2011 | Prasad ............. H04L 25/03331 |
| | | 375/224 |
| 2013/0034191 A1 | 2/2013 | Sakai et al. |
| 2014/0211880 A1 | 7/2014 | Sagong |
| 2014/0211887 A1 | 7/2014 | Sagong et al. |
| 2015/0230118 A1 | 8/2015 | Lim et al. |

FOREIGN PATENT DOCUMENTS

| | | |
|---|---|---|
| KR | 10-2014-0096560 | 8/2014 |
| KR | 10-2015-0094164 | 8/2015 |

OTHER PUBLICATIONS

Written Opinion of the International Searching Authority dated Dec. 2, 2014 in connection with International Patent Application No. PCT/KR2014/007560, 5 pages.

Changkyu Seol, et al., "A Statistical Inter-Cell Interference Model for Downlink Cellular OFDMA Networks Under Log-Normal Shadowing and Multipath Rayleigh Fading", IEEE Transactions on Communications, vol. 57, No. 10, Oct. 2009, 9 pages.

* cited by examiner

[Fig. 1]
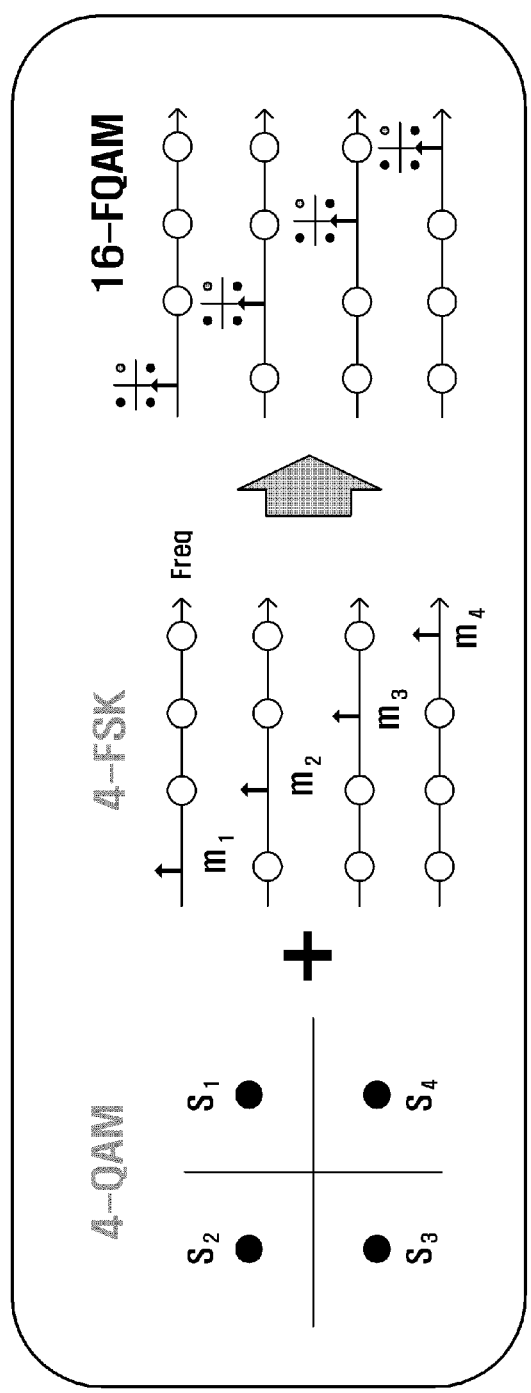

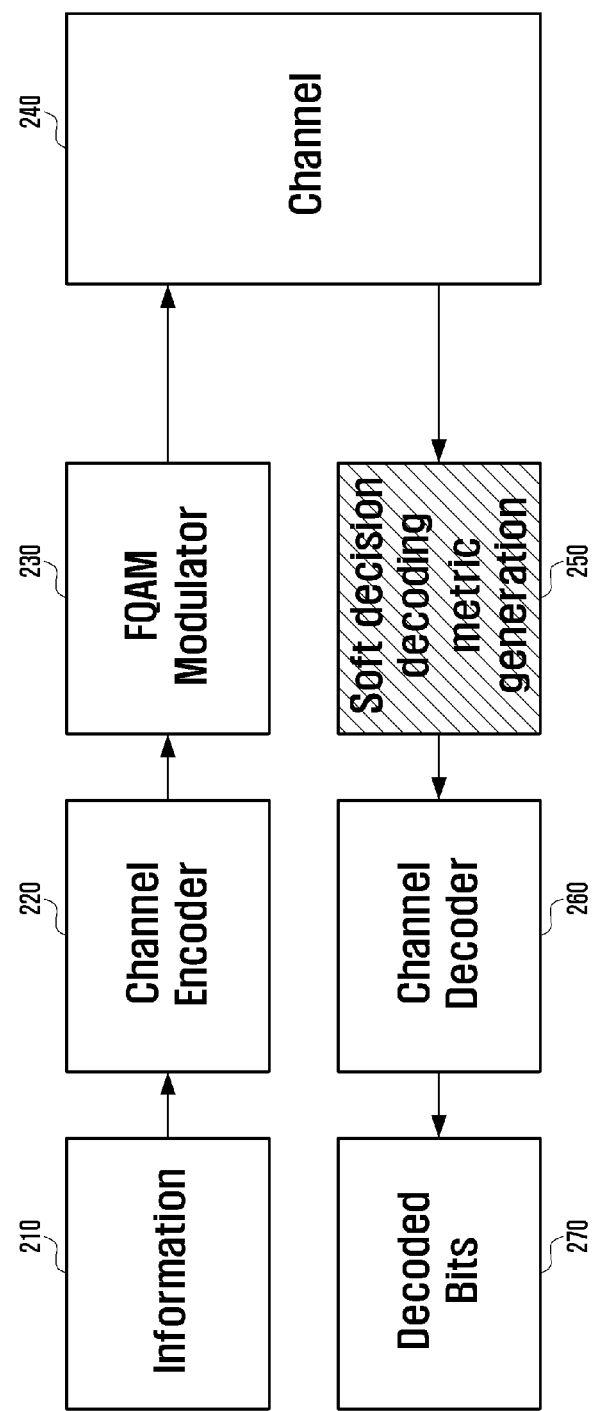
[Fig. 2]

[Fig. 3]
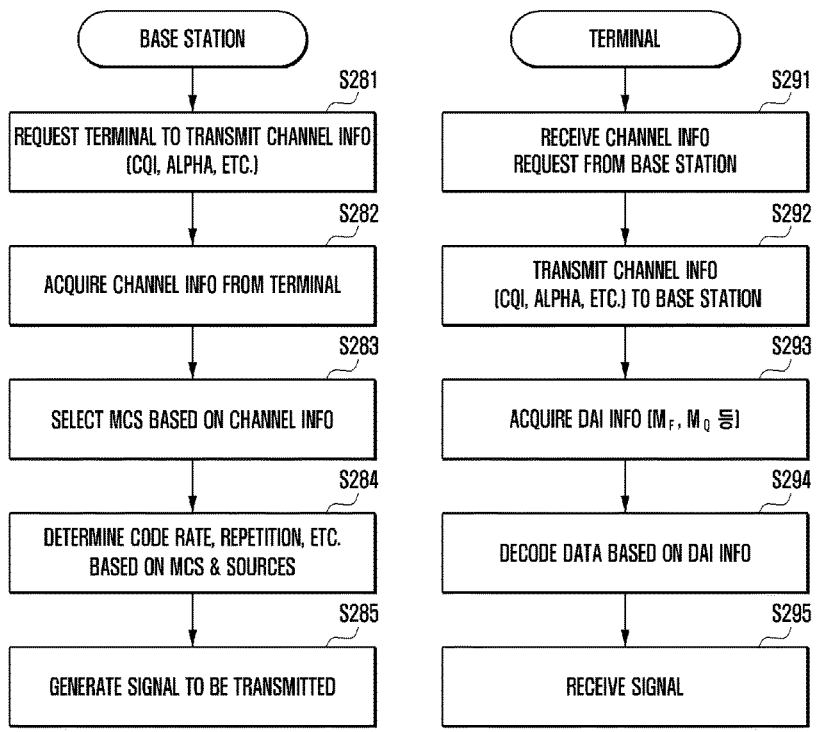
[Fig. 4]
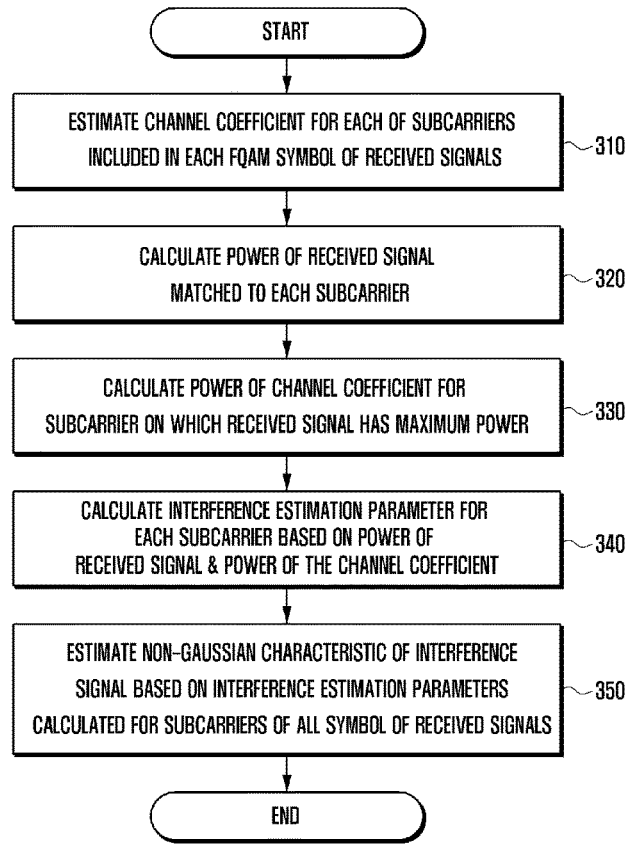

[Fig. 5]
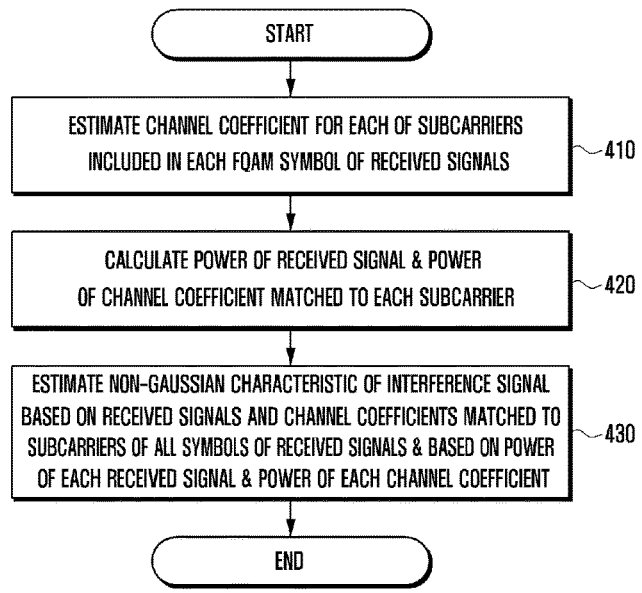
[Fig. 6]
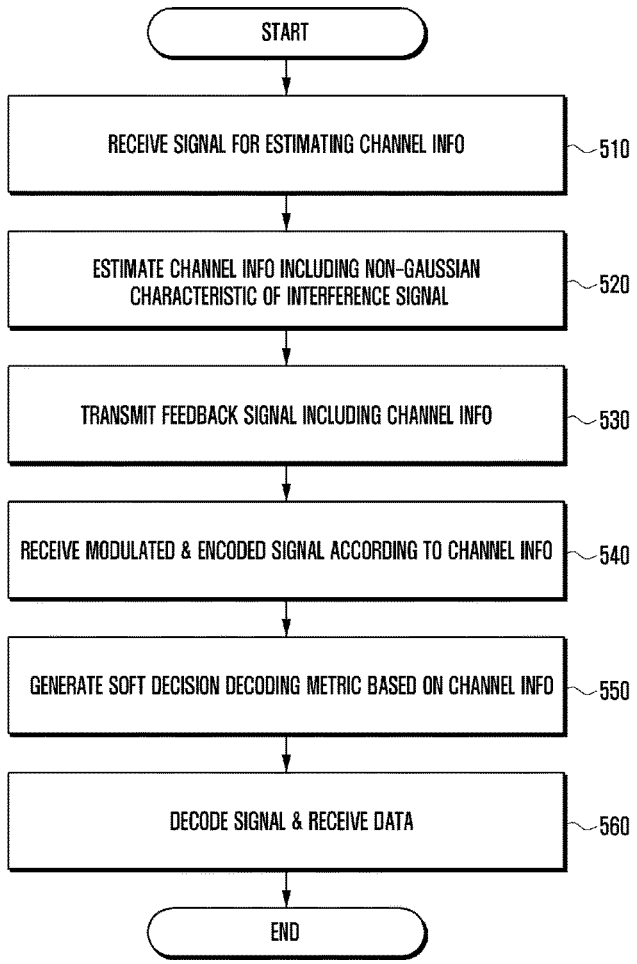

[Fig. 7]
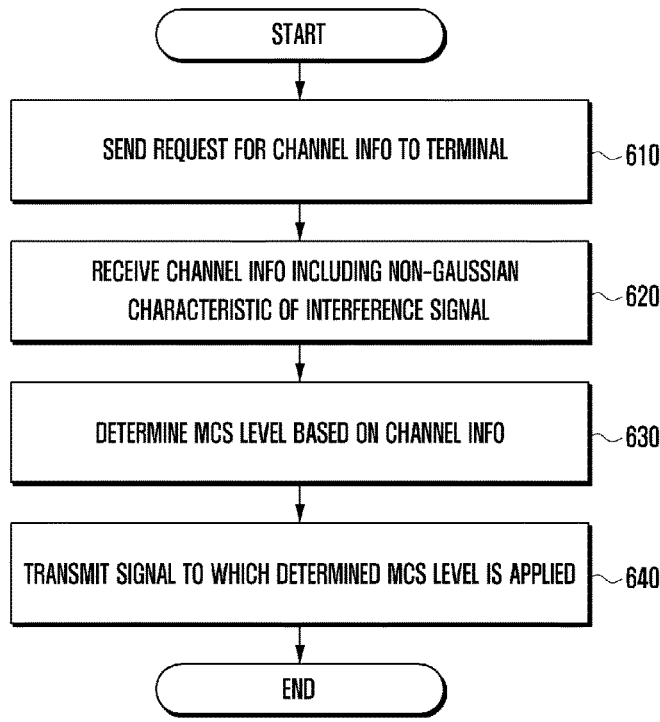
[Fig. 8]
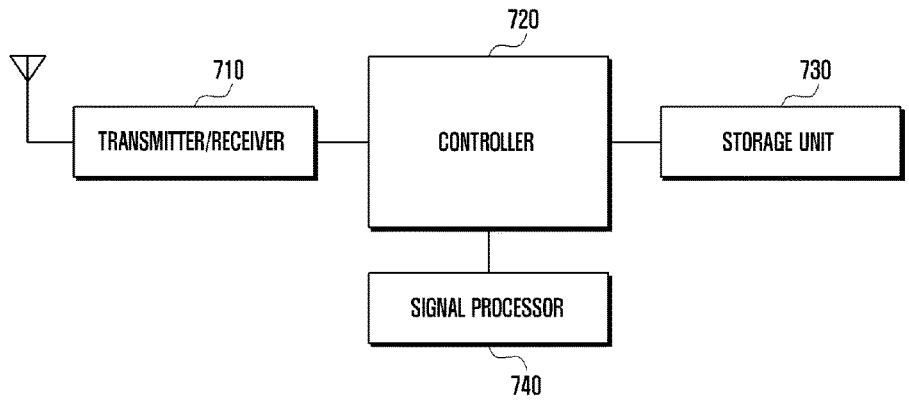
[Fig. 9]
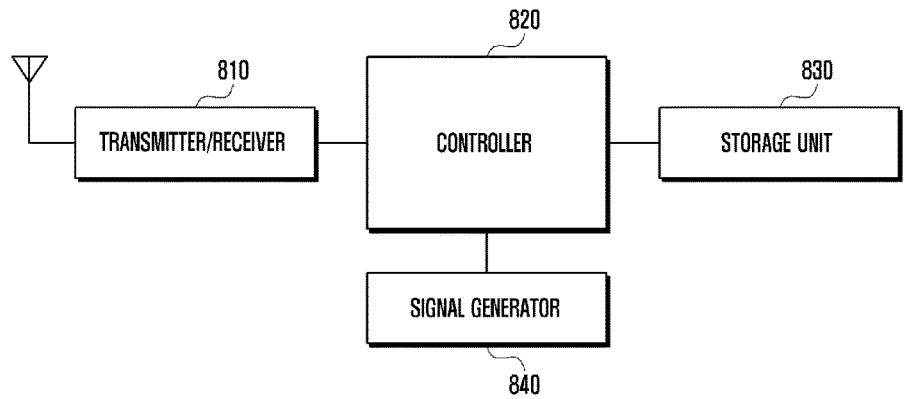

[Fig. 10]
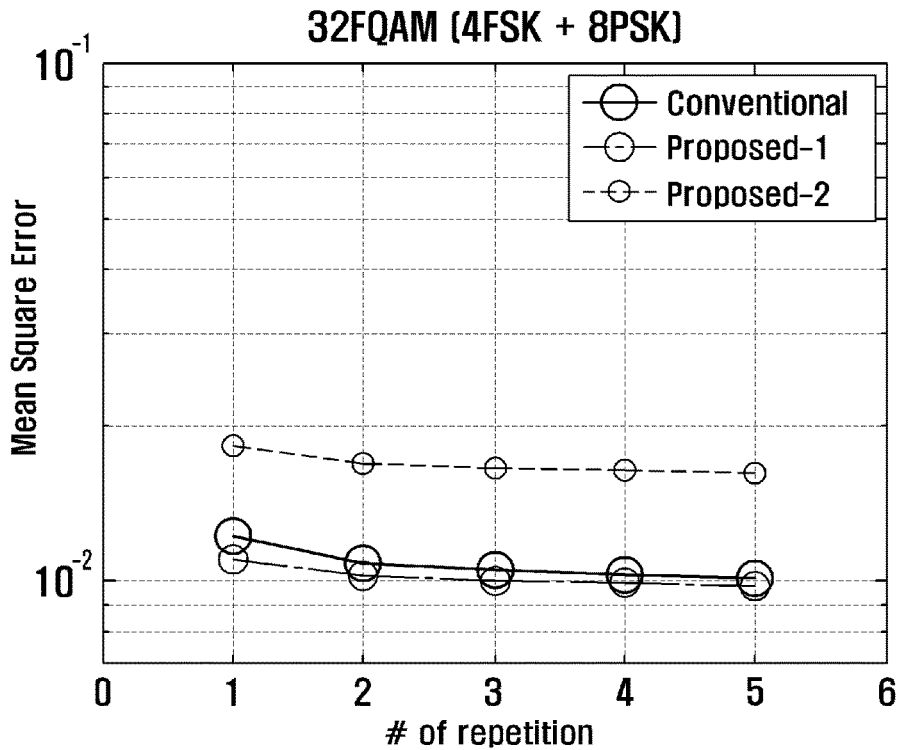
[Fig. 11]
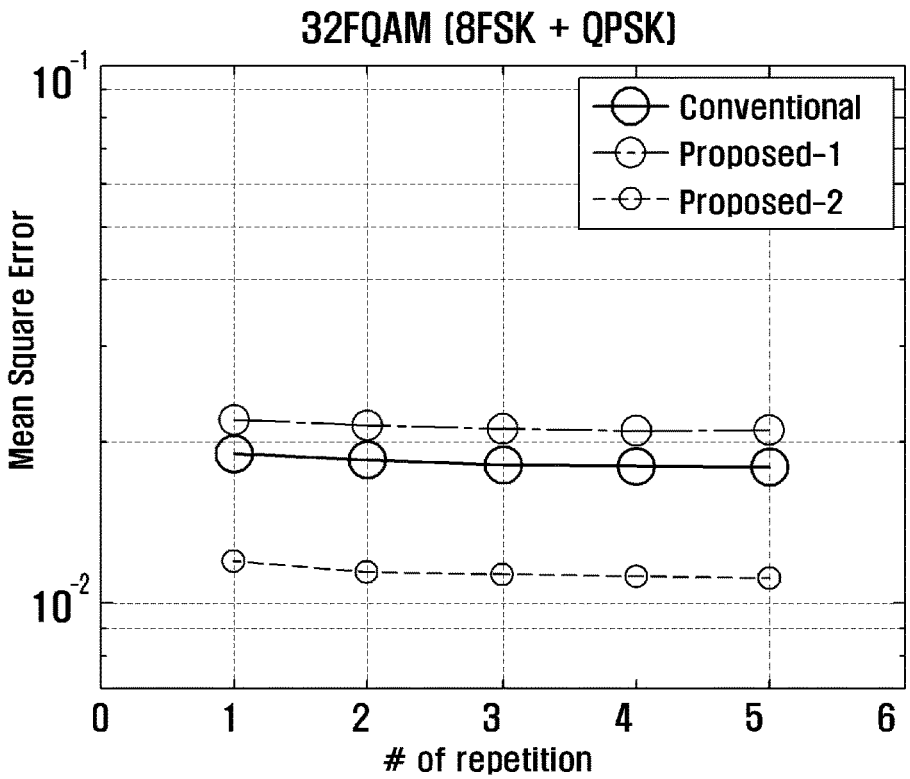

[Fig. 12]
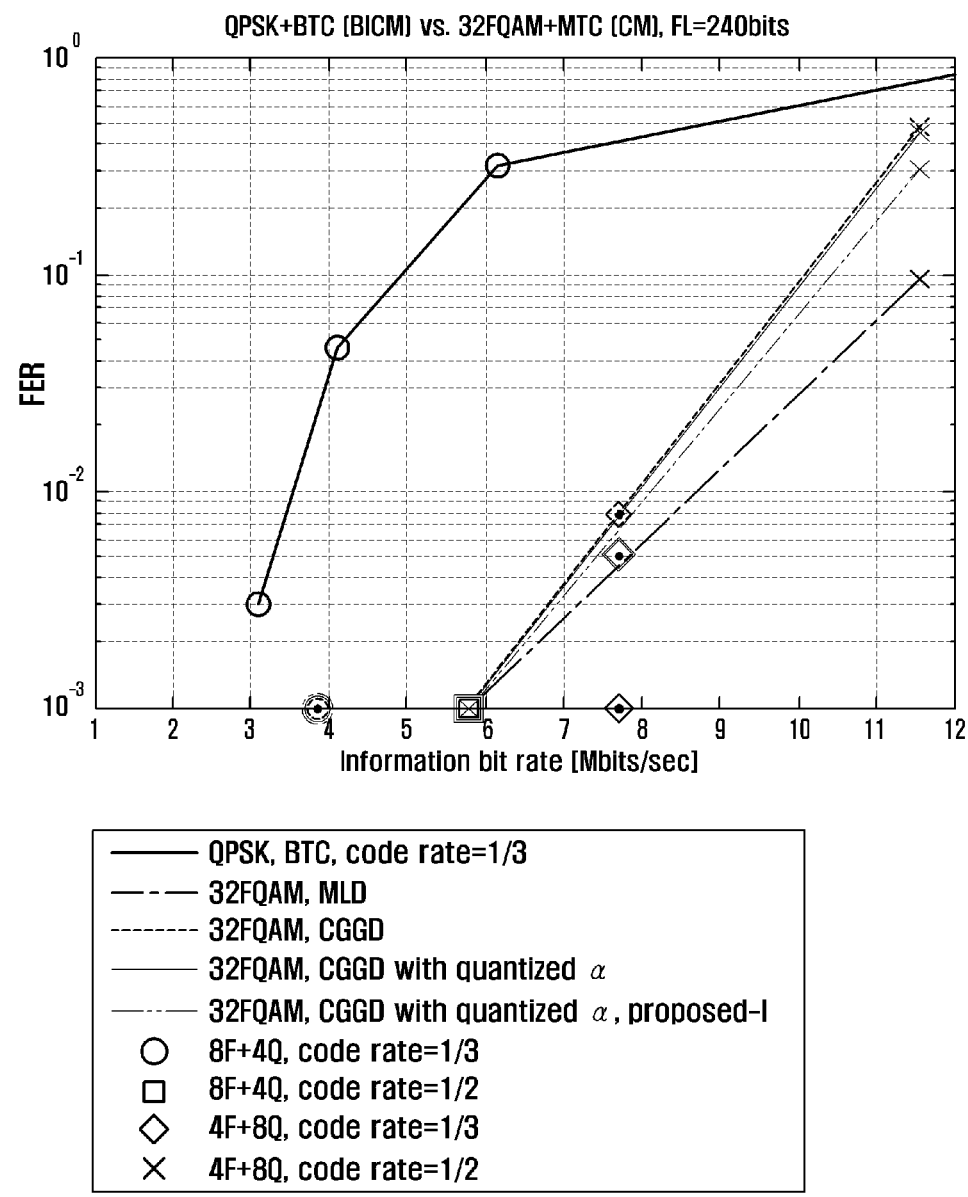

[Fig. 13]
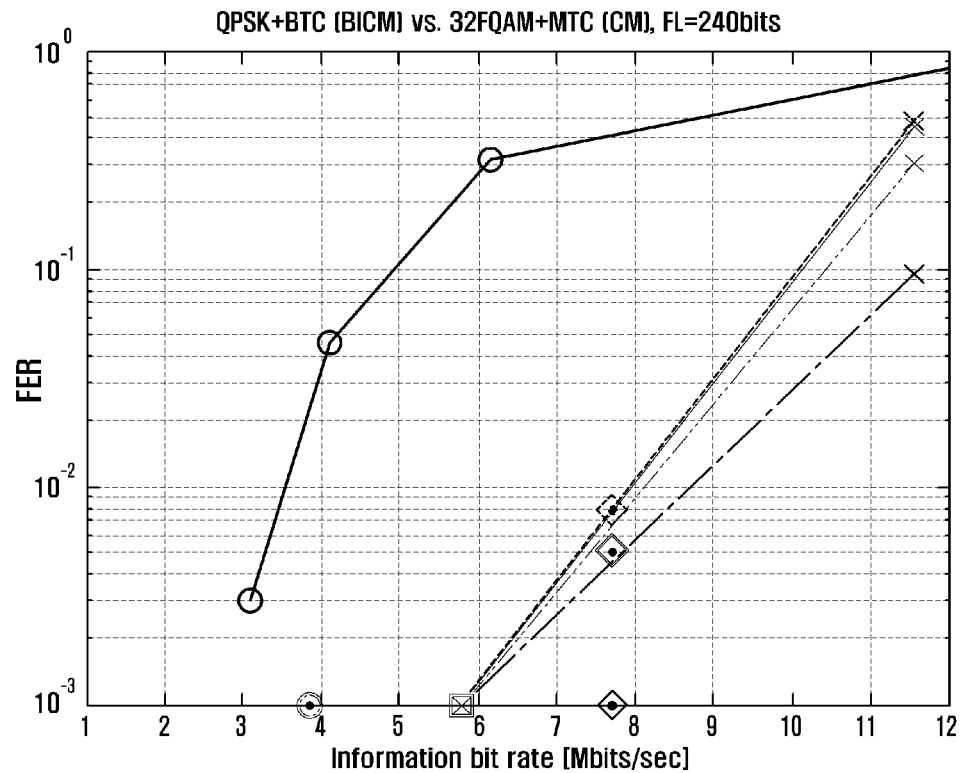
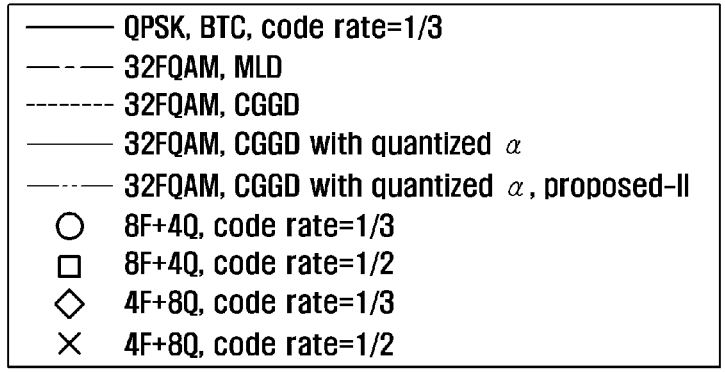

METHOD AND APPARATUS FOR ESTIMATING CHANNEL INFORMATION

CROSS-REFERENCE TO RELATED APPLICATION(S)

The present application claims priority under 35 U.S.C. § 365 to International Patent Application No. PCT/KR2014/007560 filed Aug. 14, 2014, entitled "METHOD AND DEVICE FOR ESTIMATING CHANNEL INFORMATION", and, through International Patent Application No. PCT/KR2014/007560, to Korean Patent Application No. 10-2013-0096299 filed Aug. 14, 2014, each of which are incorporated herein by reference into the present disclosure as if fully set forth herein.

TECHNICAL FIELD

The present invention relates generally to a method and an apparatus for estimating channel information, and more particularly, to a method in which a terminal receives a signal for estimating a channel from a base station and feeds back, to a base station, channel information including a parameter representing a non-Gaussian characteristic of a calculated interference signal.

BACKGROUND ART

Previously, a Gaussian assumption has been applied to an interference signal in order to operate a system, such as Adaptive Modulation and Coding (AMC), the generation of a soft decision decoding metric, or the like, with a low level of complexity. Accordingly, a Quadrature Amplitude Modulation (QAM)-based modulation scheme has been mainly used to cause a characteristic of an interference signal to be as close as possible to a Gaussian characteristic.

However, a non-Gaussian channel has a channel capacity larger than that of a Gaussian channel. Accordingly, when a statistical characteristic of an interference signal is appropriately reflected during the operation of a system, network throughput can be obtained which is higher over a non-Gaussian channel than over a Gaussian channel. In this regard, it has been required to develop a modulation scheme which allows an interference signal to have a non-Gaussian characteristic, and thus a modulation scheme proposed according the requirement is a Frequency and Quadrature Amplitude Modulation (FQAM) scheme.

FIG. 1 is a view for explaining the concept of FQAM. Referring to FIG. 1, FQAM is a modulation scheme obtained by combining QAM with Frequency-Shift Keying (FSK), and has a characteristic which causes a characteristic of Inter-Cell Interference (ICI) signal to be non-Gaussian, similarly to a case of FSK. Also, FQAM simultaneously uses the QAM scheme, and thus can greatly improve spectral efficiency, as compared with the FSK scheme.

When a statistical characteristic of an interference signal is non-Gaussianized due to the application of a modulation scheme such as FQAM, it is difficult to apply an operation scheme of AMC technology, which is designed based on a Gaussian channel of the related art, and a method for generating a soft decision decoding metric.

The AMC technology is a scheme in which a channel state of itself is observed, a channel capacity is predicted based on the observed channel state, and an optimal modulation order and an optimal coding rate are applied. The AMC scheme designed based on a Gaussian channel determines an optimal modulation order and an optimal coding rate mainly by using a Signal-to-Noise Ratio (SNR). This is because, in the case of a Gaussian channel, a channel capacity can be predicted depending on an SNR. In contrast, in the case of a non-Gaussian channel, a channel capacity greatly changes depending on not only an SNR but also the degree of non-Gaussianization of a channel, and thus it is necessary to estimate the degree of non-Gaussianization of a channel.

Also, it is well-known that the decoding performance of a system is significantly degraded when a Gaussian soft decision metric is applied to a situation in which a statistical characteristic of an interference signal has a non-Gaussian characteristic. Accordingly, when a statistical characteristic of an interference signal is non-Gaussianized due to the application of a modulation scheme such as FQAM, it is necessary to reflect the degree of non-Gaussianization of a channel during the generation of a soft decision decoding metric. As a result, even when the soft decision decoding metric is generated, a process for estimating the non-Gaussianization of a channel is required.

DISCLOSURE OF INVENTION

Technical Problem

In order to solve the above-mentioned problems, an embodiment of the present invention provides a method capable of estimating the degree of non-Gaussianization of an interference signal, with a low level of complexity.

Solution to Problem

In order to solve the above-mentioned technical problems, in accordance with an aspect of the present invention, a method for estimating channel information in a terminal is provided. The method includes receiving a signal from a base station; estimating a channel coefficient matched to each of subcarriers included in each symbol of the received signals; calculating power of the received signal matched to each of the subcarriers; calculating power of a channel coefficient for a reference subcarrier from among the subcarriers; calculating an interference estimation parameter for each of the subcarriers based on the power of the received signal and the power of the channel coefficient of the reference subcarrier; calculating a non-Gaussian characteristic parameter of an interference signal related to the received signals based on the interference estimation parameters calculated for the subcarriers of all the symbols of the received signals; and transmitting channel information including the non-Gaussian characteristic parameter to the base station.

In accordance with another aspect of the present invention, a method for estimating channel information in a terminal is provided. The method includes receiving a signal from a base station; estimating a channel coefficient matched to each of subcarriers included in each symbol of the received signals; calculating power of the received signal matched to each of the subcarriers and power of the channel coefficient for each of the subcarriers; calculating a non-Gaussian characteristic parameter of an interference signal related to the received signal, based on the received signal and the channel coefficient for each of the subcarriers of all the symbols of the received signals and based on the power of the received signal and the power of the channel coefficient for each of the subcarriers; and transmitting channel information including the non-Gaussian characteristic parameter to the base station.

In accordance with still another aspect of the present invention, a method for receiving channel information in a base station is provided. The method includes transmitting a signal to a terminal; receiving channel information including a non-Gaussian characteristic parameter of an interference signal related to the transmitted signal from the terminal; and determining a Modulation and Coding Scheme (MCS) level based on the channel information, wherein the non-Gaussian characteristic parameter is calculated based on power of a channel coefficient for a subcarrier, on which the transmitted signal has maximum power with respect to power of the transmitted signal matched to each of subcarriers, among channel coefficients for the respective subcarriers included in each symbol of the transmitted signals and based on the power of the transmitted signal matched to each of the subcarriers.

In accordance with yet another aspect of the present invention, a method for receiving channel information in a base station is provided. The method includes transmitting a signal to a terminal; receiving channel information including a non-Gaussian characteristic parameter of an interference signal related to the transmitted signal from the terminal; and determining a Modulation and Coding Scheme (MCS) level based on the channel information, wherein the non-Gaussian characteristic parameter is calculated based on the transmitted signal and a channel coefficient for each of subcarriers of all symbols of the transmitted signals and based on power of the transmitted signal and power of the channel coefficient for each of the subcarriers.

In accordance with still yet another aspect of the present invention, an apparatus for estimating channel information in a terminal is provided. The apparatus includes a transmitter/receiver for receiving a signal from a base station, and transmitting a feedback signal including a non-Gaussian characteristic parameter of an interference signal related to the received signal to the base station; and a signal processor for estimating a channel coefficient for each of subcarriers included in each symbol of the received signals, calculating power of the received signal matched to each of the subcarriers, calculating an interference estimation parameter for each of the subcarriers based on the power of the received signal matched to each of the subcarriers and based on power of a channel coefficient for a reference subcarrier selected from among the subcarriers, and calculating a non-Gaussian characteristic parameter based on the interference estimation parameters calculated for the subcarriers of all the symbols of the received signals.

In accordance with further another aspect of the present invention, an apparatus for estimating channel information in a terminal is provided. The apparatus includes a transmitter/receiver for receiving a signal from a base station, and transmitting a feedback signal including a non-Gaussian characteristic parameter of an interference signal related to the received signal; and a signal processor for estimating a channel coefficient for each of subcarriers included in each symbol of the received signals, calculating power of the received signal matched to each of the subcarriers and power of the channel coefficient for each of the subcarriers, and calculating the non-Gaussian characteristic parameter based on the received signal and the channel coefficient for each of the subcarriers of all the symbols of the received signals and based on the power of the received signal and the power of the channel coefficient for each of the subcarriers.

In accordance with still further another aspect of the present invention, an apparatus for receiving channel information in a base station is provided. The apparatus includes a transmitter/receiver for transmitting a signal to a terminal, and receiving channel information including a non-Gaussian characteristic parameter of an interference signal related to the transmitted signal from the terminal; and a signal generator for determining a Modulation and Coding Scheme (MCS) level based on the channel information, and generating a signal to be transmitted to the terminal, wherein the non-Gaussian characteristic parameter is calculated based on power of a channel coefficient for a subcarrier, on which the transmitted signal has maximum power with respect to power of the transmitted signal matched to each of subcarriers, among channel coefficients for the respective subcarriers included in each symbol of the transmitted signals and based on the power of the transmitted signal matched to each of the subcarriers.

In accordance with yet further another aspect of the present invention, an apparatus for receiving channel information in a base station is provided. The apparatus includes a transmitter/receiver for transmitting a signal to a terminal, and receiving channel information including a non-Gaussian characteristic parameter of an interference signal related to the transmitted signal from the terminal; and a signal generator for determining a Modulation and Coding Scheme (MCS) level based on the channel information, and generating a signal to be transmitted to the terminal, wherein the non-Gaussian characteristic parameter is calculated based on the transmitted signal and a channel coefficient for each of subcarriers of all symbols of the transmitted signals and based on power of the transmitted signal and power of the channel coefficient for each of the subcarriers.

Advantageous Effects of Invention

The apparatus and the method for estimating channel information, according to embodiments of the present invention, simplify or omit a hard decision process of a received signal, and thereby can reduce a complexity level of implementation while maintaining the decoding performance of a system.

BRIEF DESCRIPTION OF DRAWINGS

FIG. 1 is a view for explaining the concept of FQAM;

FIG. 2 is a view illustrating a channel encoding process and a channel decoding process, to which embodiments of the present invention may be applied;

FIG. 3 is a view illustrating a process for transmitting and receiving channel information between a base station and a terminal, to which embodiments of the present invention may be applied;

FIG. 4 is a view illustrating a process for estimating a non-Gaussian characteristic of an interference signal according to a first embodiment of the present invention;

FIG. 5 is a view illustrating a process for estimating a non-Gaussian characteristic of an interference signal according to a second embodiment of the present invention;

FIG. 6 is a view illustrating a process in which a terminal feeds back channel information to a base station;

FIG. 7 is a view illustrating a process in which a base station receives channel information fed back from a terminal and generates a signal;

FIG. 8 is a block diagram illustrating a configuration of a terminal which may be implemented according to embodiments of the present invention;

FIG. 9 is a block diagram illustrating a configuration of a base station which may be implemented according to embodiments of the present invention;

FIG. 10 and FIG. 11 are views each illustrating a result of measuring performances in the case of estimating a non-Gaussian characteristic of an interference signal according to first and second embodiments of the present invention; and FIG. 12 and FIG. 13 are views each illustrating a result of measuring, in a 3GPP LTE system, performances of estimating a non-Gaussian characteristic of an interference signal according to first and second embodiments of the present invention.

MODE FOR THE INVENTION

Hereinafter, exemplary embodiments of the present invention will be described with reference to the accompanying drawings. Further, in the following description of the present invention, a detailed description of known functions and configurations incorporated herein will be omitted when it may make the subject matter of the present invention rather unclear. Such an omission of unnecessary descriptions is intended to prevent obscuring of the main idea of the present invention and more clearly transfer the main idea.

Also, in specifically describing embodiments of the present invention, an Orthogonal Frequency-Division Multiple Access (OFDMA) system which has a multi-cell environment and uses at least one of FSK, FQAM and Multi-tone (MT)-FQAM as a modulation scheme will be described as an example. However, the main subject matter of the present invention may be applied even to other communication systems, in which similar technology is implemented, with slight modification without significantly departing from the scope of the present invention. Those skilled in the technical field of the present invention will be able to determine this applicability of the main subject matter of the present invention.

A technology, such as the FQAM scheme illustrated in FIG. 1, has been proposed which uses AMC by using a non-Gaussian characteristic of an interference signal in relation to a system which causes a characteristic of an ICI signal to be non-Gaussian. A method has been proposed for estimating the degree of non-Gaussianization of an interference signal and generating a soft decision decoding metric by using the estimated degree of the non-Gaussianization of the interference signal.

FIG. 2 and FIG. 3 are views illustrating a channel encoding process and a channel decoding process, to which embodiments of the present invention may be applied.

First, referring to FIG. 2, information 210 to be transmitted to a reception side is encoded by a channel encoder 220. Then, the encoded information passes through an FQAM modulator 230, and is transmitted through a channel 240. A signal transmitted to the reception side passes through a soft decision decoding metric generation process 250 in a demodulator, and then is decoded by a channel decoder 260. Finally, the decoded information bits 270 are output.

A non-Gaussian characteristic of an interference signal may be reflected during the generation of a soft decision decoding metric from among processes illustrated in FIG. 2.

Also, FIG. 3 illustrates an operation of a base station and that of a terminal for operating an AMC scheme appropriate for FQAM.

First, in operation S281, the base station may request the terminal to transmit channel information. In this case, the channel information, that the base station has requested the terminal to transmit, may include a Channel Quality Indicator (CQI), alpha, and the like. The CQI may be, for example, information on an SNR, and the alpha may signify non-Gaussianized information of an interference signal.

In operation S291, the terminal may receive a request for transmitting the channel information from the base station. In operation S292, the terminal may transmit the channel information to the base station.

In operation S282, the base station may receive the channel information transmitted by the terminal. In operation S283, the base station may determine a Modulation and Coding Scheme (MCS) level based on the received channel information. In operation S284, the base station may determine a code rate and repetition information based on the MCS level and sources. In operation S285, the base station may transmit a signal to be transmitted to the terminal, depending on the determined code rate and repetition information.

In response to the operation of the base station, in operation S293, the terminal acquires Data Allocation Indication (DAI) information, for example, an MF value, an MQ value, and the like from the base station. In operation S294, the terminal decodes data based on the DAI information acquired from the base station. In operation S295, the terminal acquires a signal transmitted by the base station.

A non-Gaussian characteristic of an interference signal may be reflected in the process for determining a MCS level from among the processes illustrated in FIG. 3.

In order to estimate the degree of non-Gaussianization of an interference signal, use is made of signals received with respect to not only a pilot symbol but also a data symbol. However, a data symbol does not output a symbol agreed upon between a transmitter and a receiver, differently from a pilot symbol. In this regard, according to the related art, a hard decision is performed on a signal received with respect to a data symbol, a component of an interference signal is estimated by removing the data symbol from the received signal, and the degree of non-Gaussianization of the interference signal is estimated by using the estimated component of the interference signal. In this case, a complexity level of a process for performing a hard decision on a received signal has a characteristic that the complexity level increases in proportion to a modulation order used in a system.

The FQAM scheme is a modulation scheme aimed at improving decoding performance in contrast to a QAM scheme by strengthening a non-Gaussian characteristic of an interference signal. In order to strengthen a non-Gaussian characteristic of an interference signal, an FSK modulation order of FQAM needs to be increased, and thus a high modulation order is applied to FQAM used in a system. Accordingly, a process for estimating the degree of non-Gaussianization of an interference signal used in the related art has a high complexity level, due to a process for performing a hard decision on a received signal, and thus may be problematic in implementing a system.

A representative of existing non-Gaussian models of interference signals is a Complex Generalized Gaussian (CGG) model. The CGG model assumes that an interference signal or noise follows a CGG distribution. The AMC scheme which is based on the assumption uses a CGG probability density function (pdf) defined by Equation (1) below.

$$f_Z(z \mid \alpha, \beta) = \frac{\alpha}{2\pi\beta^2 \Gamma\left(\frac{2}{\alpha}\right)} \exp\left(-\left(\frac{|z|}{\beta}\right)^\alpha\right) \quad (1)$$

In Equation (1), z is a variable representing noise, α is a shape parameter determining the shape of a non-Gaussian distribution, and β is a scale parameter determining the size of the non-Gaussian distribution. As the value of α changes, the shape of the non-Gaussian distribution changes. As the value of β changes, the width, height and the like of the non-Gaussian distribution change. Also, Γ is a gamma function defined by $$\Gamma(z) \triangleq \int_0^\infty t^{z-1}\exp(-t)dt$$

When α is equal to 2 in Equation (1), Equation (1) represents a typical Gaussian distribution. When a is less than 2 in Equation (1), Equation (1) represents a super-Gaussian distribution having a heavy tail. When α is greater than 2 in Equation (1), Equation (1) represents a sub-Gaussian distribution having a light tail. Specifically, a CGG decoding scheme in a case where α is equal to 2 is identical to a Gaussian decoding scheme. Most interference signals and noises are modeled as a super-Gaussian distribution or a Gaussian distribution, in which a has a value of 0 to 2. Meanwhile, in Equation (1), β serves as a variance in a Gaussian pdf.

Pdf functions used in most non-Gaussian decoding schemes have a shape parameter and a scale parameter which are respectively matched to α and β of a CGG distribution. Accordingly, in embodiments of the present invention, the CGG model is described as an example, but the above-described configuration may also be applied to a scheme in which most non-Gaussian models are used.

Meanwhile, in a method for generating a soft decision decoding metric which is based on the CGG model, a Log-Likelihood Ratio (LLR) or a Log-Likelihood (LL) vector is calculated by using a CGG pdf defined by Equation (1), and then a result of the calculation is delivered to the channel decoder.

A binary decoder calculates an LLR as defined by Equation (2) below.

$$L_{k,\lambda}^{BICM}(\hat{H}[k], y[k]) = \ln \frac{\sum_{w \in A_0^\lambda} f_{Y[k]}(y[k] \mid \hat{H}[k], s[k] = w)}{\sum_{w \in A_1^\lambda} f_{Y[k]}(y[k] \mid \hat{H}[k], s[k] = w)} \quad (2)$$

In Equation (2), $L_{(k,\lambda)}^{BICM}$ represents an LLR of a λ-th bit of a k-th symbol matched to binary decoding, $\hat{H}[k]$ represents an estimated value of a channel coefficient for a k-th transmission symbol, y[k] represents a received signal matched to the k-th transmission symbol, $A_0^\lambda$ represents a set of candidate symbols in which a λ-th bit is equal to 0, $A_1^\lambda$ represents a set of candidate symbols in which a λ-th bit is equal to 1, $f_{Y[k]}()$, represents a pdf of a k-th received symbol, and s[k] represents the k-th transmission symbol. Also, w is a dummy variable representing a candidate for a transmissible symbol. In the case of 16-QAM, $A_0^\lambda$ includes 8 symbols of a total of 16 symbols, and $A_1^\lambda$ includes remaining 8 symbols of the total of 16 symbols.

Also, a non-binary decoder calculates an LL vector as defined by Equation (3) below, and then uses a result of the calculation as an input.

$$L_k^{CM}(y[k], \hat{H}[k]) = (L_0 L_1 \ldots L_{M-1}) \text{ where } L_l = \ln(f_{Y[k]}(y[k]\mid\hat{H}[k], s[k]=x_l)) \quad (3)$$

In Equation (3), $L_k^{CM}$ represents a symbol LL vector for a k-th symbol, y[k] represents a received signal matched to a k-th transmission symbol, $\hat{H}[k]$ represents an estimated value of a channel coefficient for the k-th transmission symbol, $L_l$ represents an LL value matched to an l-th candidate symbol, $f_{Y[k]}()$ represents a pdf of a k-th received symbol, s[k] represents the k-th transmission symbol, and $x_l$ represents the l-th candidate symbol.

In order to calculate an LLR or an LL vector required to decode a channel as described above, it is necessary to calculate a pdf. In the case of QAM, for CGG decoding, a pdf is calculated by using Equation (4) below.

$$f_{Y[k]}(y[k] \mid \hat{H}[k], s[k]) = \frac{\alpha}{2\pi\beta^2\Gamma(2/\alpha)}\exp\left(-\left(\frac{|y[k] - H[k]s[k]|}{\beta}\right)^\alpha\right) \quad (4)$$

In equation (4), $f_{Y[k]}()$ represents a pdf of a received symbol, y[k] represents a received signal matched to a k-th transmission symbol, $\hat{H}[k]$ represents an estimated value of a channel coefficient for the k-th transmission symbol, s[k] represents the k-th transmission symbol, α represents a shape parameter, β represents a scale parameter, and represents a gamma function and is defined by $$\Gamma(z) \triangleq \int_0^\infty t^{z-1}\exp(-t)dt$$

In the case of FQAM, one symbol occupies multiple tones differently from QAM. Accordingly, it is not appropriate to extend a calculation method defined by Equation (4), which has been proposed for QAM, and to apply the extended calculation method to FQAM. As a result, a pdf for FQAM may be calculated as follows.

A pdf of a Gaussian symbol for FQAM may be calculated by using Equation (5) below.

$$f_{Y[k]}(y[k] \mid \hat{H}[k], m[k], s[k]) = \prod_{i=0}^{M_F-1} f_{Y_l[k]}(y_l[k] \mid \hat{H}_l[k], m[k], s[k]) \quad (5)$$

In the Equation (5), $f_{Y[K]}()$ represents a pdf of a transmission symbol, y[k] represents a received signal vector matched to a k-th FQAM transmission symbol, $\hat{H}[k]$ represents an estimated value vector of a channel coefficient for a k-th transmission symbol, m[k] represents an index of a frequency tone at which a QAM symbol is carried in a k-th FQAM block, s[k] represents a QAM symbol transmitted at an m[k] frequency tone of the k-th FQAM block, $M_F$ represents $f_{y_l}[k]()$ represents a pdf of a received symbol at an l-th tone, $y_l[k]()$ represents a received signal matched to the k-th transmission symbol at the l-th tone, and $\widehat{H_l}[k]$ represents an estimated value of a channel coefficient for the k-th transmission symbol at the l-th tone.

Also, a pdf for a received symbol at an l-th tone of an FQAM symbol may be calculated by using Equation (6) below.

$$f_{Y_l[k]}(y_l[k] \mid \hat{H}_l[k], m[k], s[k]) = \frac{\alpha}{2\pi\beta^2\Gamma(2/\alpha)}\exp\left(-\left(\frac{|y[k] - \hat{H}_l[k]s[k]\delta_{l,m[k]}|}{\beta}\right)^\alpha\right) \quad (6)$$

In Equation (6), $f_{y_l}[k]()$ represents a pdf of a received symbol at an l-th tone, $y_l[k]$ represents a received signal matched to a k-th transmission symbol at the l-th tone, $\widehat{H_l}[k]$ represents an estimated value of a channel coefficient for the k-th transmission symbol at the l-th tone, m[k]

represents an index of a frequency tone at which a QAM symbol is carried in a k-th FQAM block, s[k] represents a QAM symbol transmitted at an m[k] frequency tone of the k-th FQAM block, a represents a shape parameter, β represents a scale parameter, Γ represents a gamma function, and $\gamma_{l,m[k]}$ represents a delta function. The gamma function is defined by $$\Gamma(z) \triangleq \int_0^\infty t^{z-1} \exp(-t) dt$$

The delta function provides "1" as a result thereof when 1 is equal to m[k], or provides "0" as the result thereof when 1 is not equal to m[k].

Hereinafter, a process will be described for estimating α which is a parameter representing a non-Gaussianized characteristic of an interference signal. Specifically, α signifies a difference between a distribution of an interference signal having a non-Gaussian characteristic and a Gaussian distribution. The distribution of the interference signal has a characteristic similar to that of a CGG distribution as described above. Accordingly, α which is a shape parameter of a CGG pdf is used as a measure of a non-Gaussian characteristic.

The terminal receives a signal for channel estimation from the base station through the receiver, and collects received signals and estimated channel coefficients for an MF number of subcarriers included in each FQAM symbol, from an FFT output from the receiver. A received signal and the estimation of a channel coefficient for each subcarrier may be expressed by Equation (7) below.

$$Y[k] = (Y_1[k] Y_2[k] \ldots Y_{M_F}[k])$$

$$\hat{H}[k] = (\hat{H}_1[k] \hat{H}_2[k] \ldots \hat{H}_{M_F}[k]) \quad (7)$$

In Equation (7), $y_{l[k]}$ represents a received signal matched to an l-th subcarrier of a k-th FQAM symbol, and $\hat{H}_l[k]$ represents a channel coefficient estimated in response to the l-th subcarrier of the k-th FQAM symbol.

Next, the terminal performs a hard decision on the received signal by using Equation (7), and thereby estimates a transmission FQAM symbol as defined by Equation (8) below.

$$(\hat{m}[k], \hat{s}[k]) = \underset{(m_j[k], s_i[k]) \in C}{\mathrm{argmin}} \sum_{l=1}^{M_F} |Y_l[k] - \hat{H}_l[k] s_i[k] \delta_{m_l[k], l}|^2 \quad (8)$$

In the Equation (8), m̂[k] represents an FSK transmission symbol of FQAM estimated by performing a hard decision on a k-th FQAM received symbol, ŝ[k] represents a QAM transmission symbol of FQAM estimated by performing a hard decision on the k-th FQAM received symbol, C represents a set of possible FQAM symbols, and each FQAM symbol which is a component of C is expressed by $m_j[k]$ representing an index (i.e., an FSK symbol) of an activated subcarrier and by $s_j[k]$ representing a QAM symbol transmitted on the relevant subcarrier.

Thereafter, a result of the hard decision defined by Equation (8) is used to estimate an interference signal as defined by Equation (9) below.

$$J[k] = (J_1[k] J_2[k] \ldots J_{M_F}[k])$$

$$J_l[k] = Y_l[k] - \hat{H}_l[k] \hat{s}[k] \delta_{\hat{m}[k], l} \quad (9)$$

In Equation (9), $Y_l[k]$ represents a signal received on an l-th subcarrier from among an MF number of subcarriers included in a k-th FQAM received symbol, $\hat{H}_l[k]$ represents a channel coefficient obtained by estimating a channel for the l-th subcarrier from among the MF number of subcarriers included in the k-th FQAM received symbol, $\hat{s}_l[k]$ represents a QAM transmission symbol of FQAM estimated by performing a hard decision on the k-th FQAM received symbol, $\hat{m}_l[k]$ represents an FSK transmission symbol of FQAM estimated by performing a hard decision on the k-th FQAM received symbol, $\gamma_{l,m[k]}$ and represents a delta function.

Lastly, α representing a non-Gaussian characteristic of an interference signal is estimated by using Equation (10) below.

$$\alpha = \frac{\ln(3^6/2^{10})}{\ln\left(\frac{(E[|J_l[k]|])^2}{E[|J_l[k]|^2]} - \frac{\pi}{4} + \frac{9}{2^{3.5}}\right) + \ln\left(\frac{3}{2\sqrt{2}}\right)} \quad (10)$$

$$E\{|J_l[k]|^2\} \approx \frac{1}{N_S M_F} \sum_{k=1}^{N_S} \sum_{l=1}^{M_F} J_l[k]$$

$$E\{|J_l[k]|\} \approx \frac{1}{N_S M_F} \sum_{k=1}^{N_S} \sum_{l=1}^{M_F} \sqrt{J_l[k]}$$

In Equation (10), NS may signify the number of received FQAM symbols used to estimate α. Alternatively, according to an embodiment of the present invention, the NS does not need to be limitedly interpreted to the number of symbols of received signals. For example, as a parameter determined based on the number of symbols of received signals, a definition may be made of a parameter having a value which is greater than "1" and is less than the number of symbols of the received signals.

Meanwhile, the value of β which is a scale parameter of a CGG pdf is estimated from the estimated value of a as defined by Equation (11) below.

$$\beta = \frac{\Gamma(2/\alpha)}{\Gamma(3/\alpha)} E[|J_l[k]|]. \quad (11)$$

As described above, previously, a hard decision is performed on a received signal in a process for estimating α and a combination corresponding to a modulation order is obtained from C representing a set of possible FQAM symbols. Accordingly, it has been problematic in that the complexity level of the calculations increases.

Accordingly, embodiments of the present invention propose a method capable of simplifying a process for estimating a non-Gaussian characteristic of an interference signal.

FIG. 4 is a view illustrating a process for estimating a non-Gaussian characteristic of an interference signal according to a first embodiment of the present invention.

Referring to FIG. 4, in operation 310, the terminal estimates a channel coefficient by estimating a channel for each of subcarriers included in each FQAM symbol of a signal received from the base station. In the first embodiment of the present invention, a case is considered in which received signals are received on an NS number of symbols and each symbol includes an NF number of subcarriers. A received signal and a channel coefficient for each subcarrier of a k-th symbol from among the NS number of symbols may be expressed by Equation (7).

In operation 320, the terminal calculates power of a received signal matched to each subcarrier. The calculated power of the received signal may be expressed by Equation (12) below.

$$(|Y_1[k]|^2 |Y_2[k]|^2 \ldots |Y_{M_F}[k]|^2) \quad (12)$$

In operation 330, the terminal may compare power of a received signal and power of another received signal, which are obtained by using Equation (12), and may set at least one subcarrier as a reference subcarrier. For example, the terminal may set a subcarrier on which a received signal has maximum power as a reference subcarrier based on power of a signal received on each of the subcarriers. Then, the terminal may calculate power of a channel coefficient of each subcarrier estimated for the reference subcarrier. For example, when the reference subcarrier is the subcarrier on which the received signal has the maximum power, the terminal calculates power of a channel coefficient estimated for the subcarrier on which the received signal has the maximum power. When a received signal matched to an l-th subcarrier has maximum power, power of a channel coefficient for the relevant subcarrier may be expressed by $|\widehat{H_l}[k]|^2$.

In operation 340, based on the power of the received signal for each subcarrier and the power of the channel coefficient for the subcarrier on which the received signal has the maximum power, the terminal performs calculation as defined by Equation (13) below, and calculates an interference estimation parameter.

$$Z_l[k] = \left| |Y_l[k]|^2 - |\hat{H}_l[k]|^2 \delta_{l,\hat{m}[k]} \right| \text{ where} \quad (13)$$

$$\hat{m}[k] = \underset{l=1,2,\ldots,M_F}{\operatorname{argmax}} |Y_l[k]|^2$$

In Equation (13), $Z_l[k]$ represents an interference estimation parameter for an l-th subcarrier of a k-th FQAM symbol, $|Y_l[k]|^2$ represents power of a signal received on an l-th subcarrier of a k-th symbol, $|\widehat{H_l}[k]|^2$ represents power of a channel coefficient for the l-th subcarrier of the k-th symbol, and $\gamma_{l,\hat{m}[k]}$ represents a delta function.

Specifically, in the first embodiment of the present invention, when an interference estimation parameter for each subcarrier is calculated, consideration is given to only the power of the channel coefficient estimated for the subcarrier on which the received signal has the maximum power. For example, when a received signal having maximum power appears on a second subcarrier, an interference estimation coefficient for each of an MF number of subcarriers may be calculated by using Equation (14) below.

$$(Z_1[k] = |Y_1[k]|^2 Z_2[k] = ||Y_2[k]|^2 - |\hat{H}_2[k]|^2 | \ldots Z_{M_F}[k] = |Y_{M_F}[k]|^2) \quad (14)$$

Finally, in operation 350, the terminal estimates the value of α which is a non-Gaussian characteristic of an interference signal based on the interference estimation parameters calculated for the subcarriers included in all the FQAM symbols of the received signals.

α may be calculated by using Equation (15) below.

$$\alpha = \frac{\ln(3^6/2^{10})}{\ln\left(\frac{(E[|G_l[k]|])^2}{E[|G_l[k]|^2]} - \frac{\pi}{4} + \frac{9}{2^{3.5}}\right) + \ln\left(\frac{3}{2\sqrt{2}}\right)} \quad (15)$$

-continued $$E\{|G_l[k]|^2\} \approx \frac{1}{N_S M_F} \sum_{k=1}^{N_S} \sum_{l=1}^{M_F} Z_l[k]$$

$$E\{|G_l[k]|\} \approx \frac{1}{N_S M_F} \sum_{k=1}^{N_S} \sum_{l=1}^{M_F} \sqrt{Z_l[k]}$$

Specifically, according to the first embodiment of the present invention, the terminal calculates an interference estimation parameter in view of only power of a channel coefficient estimated for a subcarrier on which a received signal has maximum power among subcarriers of each FQAM with respect to a signal received from the base station in order to estimate channel information. Then, the terminal calculates an average of the interference estimation parameters for the subcarriers of all the symbols and an average of square roots of the interference estimation parameters for the subcarriers of all the symbols, and estimates a representing a non-Gaussian characteristic of an interference signal based on the calculated averages. According to the first embodiment of the present invention, a complexity level of a system can be reduced by simplifying a hard decision process for estimating interference.

FIG. 5 is a view illustrating a process for estimating a non-Gaussian characteristic of an interference signal according to a second embodiment of the present invention.

Referring to FIG. 5, in operation 410, the terminal estimates a channel coefficient by estimating a channel for each of subcarriers included in each FQAM symbol of a signal received from the base station. In the second embodiment of the present invention, a case is considered in which received signals are received on an NS number of symbols and each symbol includes an NF number of subcarriers. A received signal and a channel coefficient for each subcarrier of a k-th symbol from among the NS number of symbols may be expressed as defined by Equation (7).

In operation 420, the terminal calculates power of a received signal and power of a channel coefficient, which are matched to each subcarrier. The calculated power of the received signal and the calculated power of the channel coefficient may be expressed by Equation (16) below.

$$(|Y_1[k]|^2 |Y_2[k]|^2 \ldots |Y_{M_F}[k]|^2)$$

$$(|\hat{H}_1[k]|^2 |\hat{H}_2[k]|^2 \ldots |\hat{H}_{M_F}[k]|^2) \quad (16)$$

Finally, in operation 430, the terminal estimates a representing a non-Gaussian characteristic of an interference signal by using Equation (17) below, based on the received signals and the channel coefficients, which are matched to the subcarriers of all the symbols of the received signals, and based on the power of each received signal and the power of each channel coefficient which have been calculated by using Equation (16).

$$\alpha = \frac{\ln(3^6/2^{10})}{\ln\left(\frac{(E[|D_l[k]|])^2}{E[|D_l[k]|^2]} - \frac{\pi}{4} + \frac{9}{2^{3.5}}\right) + \ln\left(\frac{3}{2\sqrt{2}}\right)} \quad (17)$$

In Equation (17), in order to estimate α, each received signal and each channel coefficient, and the power of each received signal and the power of each channel coefficient are used as defined by Equation (18) below.

$$E\{|D_l[k]|^2\} \approx \frac{1}{N_S}\sum_{k=1}^{N_S} A[k] \text{ where} \qquad (18)$$

$$A[k] = \frac{1}{M_F}\left|\left(\sum_{l=1}^{M_F}|Y_l[k]|^2\right) - \frac{1}{M_F}\sum_{n=1}^{M_F}|\hat{H}_n[k]|^2\right|$$

$$E\{|D_l[k]|\} \approx \frac{1}{N_S}\sum_{k=1}^{N_S} B[k] \text{ where}$$

$$B[k] = \frac{1}{M_F}\left|\left(\sum_{l=1}^{M_F}|Y_l[k]|^2\right) - \frac{1}{M_F}\sum_{n=1}^{M_F}|\hat{H}_n[k]|\right|$$

Specifically, according to the second embodiment of the present invention, the terminal calculates power of a received signal and power of a channel coefficient for each of subcarriers of each FQAM symbol with respect to a signal received from the base station in order to estimate channel information, and estimates α representing a non-Gaussian characteristic of an interference signal by intactly using the calculated pieces of information. Accordingly, a process matched to the hard decision process for estimating interference is not performed, so that a complexity level of a system can be reduced.

According to the above-described embodiments of the present invention, α representing a non-Gaussian characteristic of an interference signal estimated by the terminal is channel information, and may be transmitted to the base station and may be used for determining an MCS level by the base station, or may be used to decode a signal that the terminal has received from the base station. Hereinafter, a process will be described in which the terminal transmits channel information to the base station and decodes a signal received from the base station before acquiring data.

FIG. 6 is a view illustrating a process in which a terminal feeds back channel information to a base station.

Referring to FIG. 6, in operation S10, the terminal receives a signal for estimating channel information, from the base station. In operation S20, the terminal estimates channel information including α representing a non-Gaussian characteristic of an interference signal. The above-described first and second embodiments of the present invention may be applied to a case where the terminal estimates the non-Gaussian characteristic. Also, at this time, the channel information including α may be obtained together with other pieces of information, such as a Channel Quality Indicator (CQI) and the like, that a scheduler of the base station needs.

In operation S30, the terminal transmits a feedback signal including the estimated channel information to the base station. Also, the terminal may decode a currently-received signal in such a manner as to reflect the estimated non-Gaussian characteristic.

In operation S40, the terminal receives a modulated and encoded signal according to the channel information from the base station. In operation S50, the terminal estimates channel information and generates a soft decision decoding metric in order to decode the received signal and acquire data. The process for generating a soft decision decoding metric is performed as described above, and the non-Gaussian characteristic of the interference signal is reflected in the process.

Finally, in operation S60, the terminal decodes the received signal, and acquires data included in the received signal.

FIG. 7 is a view illustrating a process in which a base station receives channel information fed back from a terminal and generates a signal.

Referring to FIG. 7, in operation 610, the base station sends a request for channel information to the terminal. At this time, when the base station previously sets a condition such as a channel information measurement cycle for the terminal, a process for requesting channel information may be omitted. When the base station receives channel information including a non-Gaussian characteristic of an interference signal from the terminal in operation 620, in operation 630, the base station determines an MCS level for signal transmission based on the received channel information.

Here, the non-Gaussian characteristic of the interference signal is estimated by the terminal according to the above-described first and second embodiments of the present invention, and the base station may receive the channel information together with other pieces of information, such as a CQI and the like, that the scheduler of the base station needs.

In operation 640, the base station transmits a signal, which is generated according to the MCS level determined in operation 640, to the terminal.

FIG. 8 is a block diagram illustrating a configuration of a terminal which may be implemented according to embodiments of the present invention.

Referring to FIG. 8, the terminal according to embodiments of the present invention may include a transmitter/receiver 710, a controller 720, a storage unit 730, and a signal processor 740.

The transmitter/receiver 710 transmits and receives signals and data to/from the base station via a wireless network. In embodiments of the present invention, according to the control of the controller 720, the transmitter/receiver 710 may receive a signal including a pilot symbol and a data symbol from the base station, and may transmit a feedback signal including channel information to the base station.

The storage unit 730 may be implemented as storage devices of various forms, and may be mounted inside the controller 720 or the signal processor 740, or may be connected to the controller 720 or the signal processor 740 in various methods. Also, the storage unit 730 may include a module implemented to estimate channel information and process a signal according to an embodiment of the present invention.

The signal processor 740 performs processing, such as channel estimation, demodulation and decoding, and the like, on a signal received from the base station. Particularly, according to an embodiment of the present invention, the signal processor 740 may perform an arithmetic operation for estimating a non-Gaussian characteristic of an interference signal. The controller 720 may control a process for processing by the signal processor 740, and may deliver information between the transmitter/receiver 710 and the signal processor 740.

According to an embodiment of the present invention, the signal processor 740 may perform a control operation for estimating channel coefficients of respective subcarriers included in each symbol of the received signals, may perform a control operation for calculating power of the received signal matched to each of the subcarriers, may perform a control operation for calculating interference estimation parameters of the respective subcarriers based on the power of the received signal matched to each of the subcarriers and based on power of a channel coefficient for a reference subcarrier selected from among the subcarriers, and may perform a control operation for calculating the non-Gaussian characteristic parameter based on the interference estimation parameters calculated for the subcarriers of all the symbols of the received signals. At this time, the non-Gaussian characteristic parameter may be a shape parameter which determines the shape of a non-Gaussian distribution. Also, the reference subcarrier may be a subcarrier on which a received signal has a maximum power among the subcarriers.

Also, the signal processor 740 may perform a control operation for calculating interference estimation parameters for remaining subcarriers except for the reference subcarrier as power of a received signal of each subcarrier, and may perform a control operation for calculating an interference estimation parameter for the reference subcarrier as a difference between power of a received signal on a relevant subcarrier and power of the channel coefficient for the relevant subcarrier.

Also, the signal processor 740 may perform a control operation for calculating a non-Gaussian characteristic parameter of a non-Gaussian probability density function (pdf) expressing the interference signal, based on an average of the interference estimation parameters for the subcarriers of all the symbols of the received signals and an average of square roots of the interference estimation parameters for the subcarriers of all the symbols of the received signals.

Further, the signal processor 740 may perform a control operation for generating soft decision information for decoding the received signal by applying the non-Gaussian characteristic parameter.

In addition, the signal processor 740 may perform a control operation for determining a non-Gaussian characteristic parameter based on Equation (13) to Equation (15).

An operation and a function of the terminal have been described in each block. The description of the terminal in each block is made for convenience of description, and the right scope of the present invention is not limited thereto. For example, the signal processor 740 may be included in the controller 720. In this case, a function of the signal processor 740 may be performed by the controller 720. Alternatively, in embodiments of the present invention, the terminal may perform not only the operations of the terminal described in FIG. 8 but also the operations and the functions of the terminal described in FIG. 1 to FIG. 7.

FIG. 9 is a block diagram illustrating a configuration of a base station which may be implemented according to embodiments of the present invention.

Referring to FIG. 9, the base station according to embodiments of the present invention may include a transmitter/receiver 810, a controller 820, a storage unit 830, and a signal generator 840.

The transmitter/receiver 810 transmits and receives signals and data to/from the terminal via a wireless network. In embodiments of the present invention, according to the control of the controller 820, the transmitter/receiver 810 may transmit a signal including a pilot symbol and a data symbol to the terminal, and may receive a feedback signal including channel information.

The storage unit 830 may be implemented as storage devices of various forms, and may be mounted inside the controller 820 or the signal generator 840, or may be connected to the controller 820 or the signal generator 840 in various methods. Also, the storage unit 830 may include a module implemented to generate a signal based on channel information estimated according to an embodiment of the present invention.

The signal generator 840 performs processing, such as modulation and encoding, and the like, based on feedback information received from the terminal. Particularly, in a process for generating a signal, a non-Gaussian characteristic of an interference signal that the terminal estimates according to an embodiment of the present invention may be reflected. The controller 820 may control a process for processing by the signal generator 840, and may deliver information between the transmitter/receiver 810 and the signal generator 840.

An operation and a function of the base station have been described in each block. The description of the base station in each block is made for convenience of description, and the right scope of the present invention is not limited thereto. Also, in embodiments of the present invention, the base station may perform not only the operations of the base station described in FIG. 9 but also the operations of the base station described in FIG. 1 to FIG. 7.

FIG. 10 and FIG. 11 are views each illustrating a result of measuring performances in the case of estimating a non-Gaussian characteristic of an interference signal according to the above-described first and second embodiments of the present invention. Performances are measured by comparing a conventional method for estimating a non-Gaussian characteristic (denoted by "Conventional"), a mean square error according to the first embodiment of the present invention (denoted by "Proposed-1"), and a mean square error according to the second embodiment of the present invention (denoted by "Proposed-2"). Also, a case is considered in which the number of base stations is equal to 3 and transmission power of a base station is equal to 20 W.

First, FIG. 10 illustrates a result of comparing mean square errors in estimating a non-Gaussian characteristic of an interference signal in the case of 32nd order FQAM in which a modulation order of FSK is equal to 4 and a modulation order of Phase Shift Keying (PSK) is equal to 8. Referring to FIG. 10, the method according to the first embodiment of the present invention shows performance similar to that of the conventional method for estimating a non-Gaussian characteristic of an interference signal.

Also, FIG. 11 illustrates a result of comparing mean square errors in estimating a non-Gaussian characteristic of an interference signal in the case of 32nd order FQAM in which a modulation order of FSK is equal to 8 and a modulation order of Phase Shift Keying (PSK) is equal to 4. Referring to FIG. 11, the method according to the first embodiment of the present invention shows performance similar to that of the conventional method for estimating a non-Gaussian characteristic of an interference signal, and the method according to the second embodiment of the present invention shows better performance than that of the conventional method.

FIG. 12 and FIG. 13 are views each illustrating a result of measuring, in a 3GPP LTE system, performances of estimating a non-Gaussian characteristic of an interference signal according to first and second embodiments of the present invention. A case is considered in which the number of base stations is equal to 3 and transmission power of a base station is equal to 20 W. Each of the graphs illustrated in FIG. 12 and FIG. 13 is a result of comparing a Bit Interleaved Coded Modulation (BICM) scheme, to which Quadrature Phase Shift Keying (QPSK) and Binary Turbo Codes (BTC) are applied, with a Coded Modulation (CM) scheme to which 32FQAM and Modified Turbo Codes (MTC) are applied. Also, a Max Logarithmic Maximum A Posteriori (max-log MAP) decoder is used, and a scaling factor is equal to 0.75, and the number of repetitions is 8.

FIG. 12 illustrates a graph of a Frame Error Rate (FER) obtained by comparing a method, to which the estimation (denoted by "proposed-I") of a non-Gaussian characteristic of an interference signal according to the first embodiment of the present invention is applied, with other methods of the related art. Referring to FIG. 12, the method to which the first embodiment of the present invention is applied has a significantly lower complexity level than that of a typical CGG Decoding (CGGD) of the related art, but shows performance almost similar to that of the typical CGGD of the related art.

Also, FIG. 13 illustrates a graph of an FER obtained by comparing a method, to which the estimation (denoted by "proposed-II") of a non-Gaussian characteristic of an interference signal according to the second embodiment of the present invention is applied, with other methods of the related art. Referring to FIG. 13, the second embodiment of the present invention, which has a more simplified form than that of the first embodiment of the present invention, also has a lower complexity level than that of the typical CGGD of the related art, and shows performance almost similar to that of the typical CGGD of the related art.

Those skilled in the art can appreciate that it is possible to implement the present invention in another specific form without changing the technical idea or the indispensable characteristics of the present invention. Accordingly, it should be understood that the embodiments described above are merely exemplary and are not limited. The scope of the present invention is defined by the appended claims to be described later, rather than the detailed description. Accordingly, it should be appreciated that all modifications or variations derived from the meaning and scope of the appended claims and their equivalents are included in the range of the present invention.

Although exemplary embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

The invention claimed is:

1. A method for estimating channel information in a terminal, the method comprising:
receiving a signal from a base station;
estimating a channel coefficient for each of a plurality of subcarriers included in each symbol of the received signals;
determining a power of the received signal matched to each of the plurality of subcarriers;
determining a power of a channel coefficient for a particular reference subcarrier from among the plurality of subcarriers;
determining an interference estimation parameter for each of the plurality of subcarriers based on the power of the received signal and the power of the channel coefficient for the reference subcarrier;
determining a non-Gaussian characteristic parameter of an interference signal related to the received signals based on the interference estimation parameters determined for the plurality of subcarriers of all of the symbols of the received signals; and
transmitting channel information including the non-Gaussian characteristic parameter to the base station.

2. The method of claim 1, wherein the non-Gaussian characteristic parameter corresponds to a shape parameter which determines a shape of a non-Gaussian distribution.

3. The method of claim 1, wherein the reference subcarrier corresponds to a subcarrier on which the received signal includes a maximum power among the plurality of subcarriers.

4. The method of claim 1, wherein an interference estimation parameter for each of the plurality of subcarriers remaining except for the reference subcarrier corresponds to the power of the received signal on each of the plurality of subcarriers, and an interference estimation parameter for the reference subcarrier corresponds to a difference between the power of the received signal on the reference subcarrier and the power of the channel coefficient for the reference subcarrier.

5. The method of claim 1, wherein determining the non-Gaussian characteristic parameter comprises determining a non-Gaussian characteristic parameter of a non-Gaussian probability density function (pdf) expressing the interference signal, based on an average of the interference estimation parameters for the plurality of subcarriers of all of the symbols of the received signals and an average of square roots of the interference estimation parameters for the plurality of subcarriers of all of the symbols of the received signals.

6. The method of claim 1, wherein at least one of frequency and quadrature amplitude modulation (FQAM), frequency-shift keying (FSK), multiple-tone frequency-shift keying (MT-FSK) and multiple-tone FQAM (MT-FQAM) is applied to the received signal.

7. The method of claim 1, further comprising generating soft decision information for decoding the received signal by applying the non-Gaussian characteristic parameter.

8. The method of claim 7, wherein the non-Gaussian characteristic parameter is determined by $$\alpha = \frac{\ln(3^6/2^{10})}{\ln\left(\frac{(E[|D_l[k]|])^2}{E[|D_l[k]|^2]} - \frac{\pi}{4} + \frac{9}{2^{3.5}}\right) + \ln\left(\frac{3}{2\sqrt{2}}\right)}$$

$$E\{|D_l[k]|^2\} \approx \frac{1}{N_S}\sum_{k=1}^{N_S} A[k] \text{ where}$$

$$A[k] = \frac{1}{M_F}\left|\left(\sum_{l=1}^{M_F}|Y_l[k]|^2\right) - \frac{1}{M_F}\sum_{n=1}^{M_F}|\hat{H}_n[k]|^2\right|$$

$$E\{|D_l[k]|\} \approx \frac{1}{N_S}\sum_{k=1}^{N_S} B[k] \text{ where}$$

$$B[k] = \frac{1}{M_F}\left|\left(\sum_{l=1}^{M_F}|Y_l[k]|\right) - \frac{1}{M_F}\sum_{n=1}^{M_F}|\hat{H}_n[k]|\right|$$

wherein $\alpha$ represents the non-Gaussian characteristic parameter, Ns represents a parameter determined based on a number of the symbols of the received signals, $M_F$ represents a number of the plurality of subcarriers included in each of the symbols of the received signals, $Y_l[k]$ represents a received signal on an l-th subcarrier of a k-th symbol, $|\hat{H}_n[k]|$ represents an estimated value of a channel coefficient for an n-th subcarrier of the k-th symbol, $|Y_l[k]|^2$ represents a power of a received signal on the l-th subcarrier of the k-th symbol, and $|\hat{H}_n[k]|^2$ represents a power of the estimated value of the channel coefficient for the n-th subcarrier of the k-th symbol.

9. The method of claim 1, wherein the non-Gaussian characteristic parameter is determined by $$\alpha = \frac{\ln(3^6/2^{10})}{\ln\left(\frac{(E[|G_l[k]|])^2}{E[|G_l[k]|^2]} - \frac{\pi}{4} + \frac{9}{2^{3.5}}\right) + \ln\left(\frac{3}{2\sqrt{2}}\right)}$$

$$E\{|G_l[k]|^2\} \approx \frac{1}{N_S M_F} \sum_{k=1}^{N_S} \sum_{l=1}^{M_F} Z_l[k]$$

$$E\{|G_l[k]|\} \approx \frac{1}{N_S M_F} \sum_{k=1}^{N_S} \sum_{l=1}^{M_F} \sqrt{Z_l[k]}$$

$$Z_l[k] = \left| |Y_l[k]|^2 - |\hat{H}_l[k]|^2 \delta_{l,\hat{m}[k]} \right| \text{ where}$$

$$\hat{m}[k] = \underset{l=1,2,\ldots,M_F}{\operatorname{argmax}} |Y_l[k]|^2,$$

wherein α represents the non-Gaussian characteristic parameter, $N_s$ represents a parameter determined based on a number of the symbols of the received signals, MF represents a number of the plurality of subcarriers included in each of the symbols of the received signals, $Z_l[k]$ represents an interference estimation parameter for an l-th subcarrier of a k-th symbol, $|Y_l[k]|^2$ represents a power of a received signal on the l-th subcarrier of the k-th symbol, $|\hat{H}_l[k]|^2$ represents a power of an estimated value of a channel coefficient for the l-th subcarrier of the k-th symbol, and $\delta_{l,\hat{m}[k]}$ representing a delta function provides "1" as a result thereof when l is equal to m̂[k] or provides "0" as the result thereof when l is not equal to m̂[k].

10. A method for estimating channel information in a terminal, the method comprising:
receiving a signal from a base station;
estimating a channel coefficient for each of a plurality of subcarriers included in each symbol of the received signals;
determining a power of the received signal matched to each of the plurality of subcarriers and a power of the channel coefficient for each of the plurality of subcarriers;
determining a non-Gaussian characteristic parameter of an interference signal related to the received signal based on the received signal and the channel coefficient for each of the plurality of subcarriers of all of the symbols of the received signals and based on the power of the received signal and the power of the channel coefficient for each of the plurality of subcarriers; and
transmitting channel information including the non-Gaussian characteristic parameter to the base station.

11. A method for receiving channel information in a base station, the method comprising:
transmitting a signal to a terminal;
receiving channel information including a non-Gaussian characteristic parameter of an interference signal related to the transmitted signal from the terminal; and
determining a modulation and coding scheme (MCS) level based on the channel information,
wherein the non-Gaussian characteristic parameter is determined based on a power of a channel coefficient for a subcarrier of a plurality of subcarriers, on which the transmitted signal includes a maximum power with respect to a power of the transmitted signal matched to each of the plurality of subcarriers, among channel coefficients for respective subcarriers of plurality of subcarriers included in each symbol of the transmitted signals and based on the power of the transmitted signal matched to each of the plurality of subcarriers.

12. A method for receiving channel information in a base station, the method comprising:
transmitting a signal to a terminal;
receiving channel information including a non-Gaussian characteristic parameter of an interference signal related to the transmitted signal from the terminal; and
determining a modulation and coding scheme (MCS) level based on the channel information,
wherein the non-Gaussian characteristic parameter is determined based on the transmitted signal and a channel coefficient for each of a plurality of subcarriers of all symbols of the transmitted signals and based on a power of the transmitted signal and a power of the channel coefficient for each of the plurality of subcarriers.

13. An apparatus for estimating channel information in a terminal, the apparatus comprising:
a transmitter or receiver configured to:
receive a signal from a base station, and
transmit a feedback signal including a non-Gaussian characteristic parameter of an interference signal related to the received signal to the base station; and
a signal processor configured to:
estimate a channel coefficient for each of a plurality of subcarriers included in each symbol of the received signals,
determine a power of the received signal matched to each of the plurality of subcarriers,
determine an interference estimation parameter for each of the plurality of subcarriers based on the power of the received signal matched to each of the plurality of subcarriers and based on a power of a channel coefficient for a reference subcarrier selected from among the plurality of subcarriers, and
determine a non-Gaussian characteristic parameter based on the interference estimation parameters determined for the plurality of subcarriers of all of the symbols of the received signals.

14. The apparatus of claim 13, wherein the non-Gaussian characteristic parameter corresponds to a shape parameter which determines a shape of a non-Gaussian distribution.

15. The apparatus of claim 13, wherein the reference subcarrier corresponds to a subcarrier on which the received signal includes a maximum power among the plurality of subcarriers.

16. The apparatus of claim 13, wherein an interference estimation parameter for each of the plurality of subcarriers remaining except for the reference subcarrier corresponds to the power of the received signal on each of the plurality of subcarriers, and an interference estimation parameter for the reference subcarrier corresponds to a difference between the power of the received signal on the reference subcarrier and the power of the channel coefficient for the reference subcarrier.

17. The apparatus of claim 13, wherein the signal processor determines a non-Gaussian characteristic parameter of a non-Gaussian probability density function (pdf) expressing the interference signal, based on an average of the interference estimation parameters for the plurality of subcarriers of all of the symbols of the received signals and an average of square roots of the interference estimation parameters for the plurality of subcarriers of all of the symbols of the received signals.

18. The apparatus of claim 13, wherein at least one of frequency and quadrature amplitude modulation (FQAM), frequency-shift keying (FSK), multiple-tone frequency-shift keying (MT-FSK) and multiple-tone FQAM (MT-FQAM) is applied to the received signal.

19. The apparatus of claim 13, wherein the signal processor generates soft decision information for decoding the received signal by applying the non-Gaussian characteristic parameter.

20. The apparatus of claim 13, wherein the non-Gaussian characteristic parameter is determined by $$\alpha = \frac{\ln(3^6/2^{10})}{\ln\left(\frac{(E[|G_l[k]|])^2}{E[|G_l[k]|^2]} - \frac{\pi}{4} + \frac{9}{2^{3.5}}\right) + \ln\left(\frac{3}{2\sqrt{2}}\right)}$$

$$E\{|G_l[k]|^2\} \approx \frac{1}{N_S M_F} \sum_{k=1}^{N_S} \sum_{l=1}^{M_F} Z_l[k]$$

$$E\{|G_l[k]|\} \approx \frac{1}{N_S M_F} \sum_{k=1}^{N_S} \sum_{l=1}^{M_F} \sqrt{Z_l[k]}$$

$$Z_l[k] = \left||Y_l[k]|^2 - |\hat{H}_l[k]|^2 \delta_{l,\hat{m}[k]}\right| \text{ where}$$

$$\hat{m}[k] = \operatorname*{argmax}_{l=1,2,\ldots,M_F} |Y_l[k]|^2,$$

wherein α represents the non-Gaussian characteristic parameter, Ns represents a parameter determined based on a number of the symbols of the received signals, MF represents a number of the plurality of subcarriers included in each of the symbols of the received signals, $Z_l[k]$ represents an interference estimation parameter for an l-th subcarrier of a k-th symbol, $|Y_l[k]|^2$ represents a power of a received signal on the l-th subcarrier of the k-th symbol, $|\hat{H}_l[k]|^2$ represents a power of an estimated value of a channel coefficient for the l-th subcarrier of the k-th symbol, and $\delta_{l,\hat{m}[k]}$ representing a delta function provides "1" as a result thereof when l is equal to m̂[k] or provides "0" as the result thereof when l is not equal to m̂[k].

21. An apparatus for estimating channel information in a terminal, the apparatus comprising:
 a transmitter or receiver configured to:
  receive a signal from a base station, and
  transmit a feedback signal including a non-Gaussian characteristic parameter of an interference signal related to the received signal; and
 a signal processor configured to:
  estimate a channel coefficient for each of a plurality of subcarriers included in each symbol of the received signals,
  determine a power of the received signal matched to each of the plurality of subcarriers and a power of the channel coefficient for each of the plurality of subcarriers, and
  determine the non-Gaussian characteristic parameter based on the received signal and the channel coefficient for each of the plurality of subcarriers of all of the symbols of the received signals and based on the power of the received signals and the power of the channel coefficient for each of the plurality of subcarriers.

22. The apparatus of claim 21, wherein the non-Gaussian characteristic parameter is determined by $$\alpha = \frac{\ln(3^6/2^{10})}{\ln\left(\frac{(E[|D_l[k]|])^2}{E[|D_l[k]|^2]} - \frac{\pi}{4} + \frac{9}{2^{3.5}}\right) + \ln\left(\frac{3}{2\sqrt{2}}\right)}$$

$$E\{|D_l[k]|^2\} \approx \frac{1}{N_S} \sum_{k=1}^{N_S} A[k] \text{ where}$$

$$A[k] = \frac{1}{M_F} \left|\left(\sum_{l=1}^{M_F} |Y_l[k]|^2\right) - \frac{1}{M_F} \sum_{n=1}^{M_F} |\hat{H}_n[k]|^2\right|$$

$$E\{|D_l[k]|\} \approx \frac{1}{N_S} \sum_{k=1}^{N_S} B[k] \text{ where}$$

$$B[k] = \frac{1}{M_F} \left|\left(\sum_{l=1}^{M_F} |Y_l[k]|\right) - \frac{1}{M_F} \sum_{n=1}^{M_F} |\hat{H}_n[k]|\right|$$

wherein α represents the non-Gaussian characteristic parameter, Ns represents a parameter determined based on a number of the symbols of the received signals, $M_F$ represents the number of the plurality of subcarriers included in each of the symbols of the received signals, $Y_l[k]$ represents a received signal on an l-th subcarrier of a k-th symbol, $|\hat{H}_n[k]|$ represents an estimated value of a channel coefficient for an n-th subcarrier of the k-th symbol, $|Y_l[k]|^2$ represents a power of a received signal on the l-th subcarrier of the k-th symbol, and $|\hat{H}_n[k]|^2|$ represents a power of the estimated value of the channel coefficient for the n-th subcarrier of the k-th symbol.

23. An apparatus for receiving channel information in a base station, the apparatus comprising:
 a transmitter or receiver configured to:
  transmit a signal to a terminal, and
  receive channel information including a non-Gaussian characteristic parameter of an interference signal related to the transmitted signal from the terminal; and
 a signal generator for determining a modulation and coding scheme (MCS) level based on the channel information, and generating a signal to be transmitted to the terminal,
 wherein the non-Gaussian characteristic parameter is determined based on a power of a channel coefficient for a subcarrier of a plurality of subcarriers, on which the transmitted signal includes a maximum power with respect to a power of the transmitted signal matched to each of the plurality of subcarriers, among channel coefficients for respective subcarriers of plurality of subcarriers included in each symbol of the transmitted signals and based on the power of the transmitted signal matched to each of the plurality of subcarriers.

24. An apparatus for receiving channel information in a base station, the apparatus comprising:
 a transmitter or receiver configured to:
  transmit a signal to a terminal, and
  receive channel information including a non-Gaussian characteristic parameter of an interference signal related to the transmitted signal from the terminal; and
 a signal generator configured to:
  determine a modulation and coding scheme (MCS) level based on the channel information, and
  generate a signal to be transmitted to the terminal, wherein the non-Gaussian characteristic parameter is determined based on the transmitted signal and a channel coefficient for each of a plurality of subcarriers of all symbols of the transmitted signals and based on a power of the transmitted signal and a power of the channel coefficient for each of the plurality of subcarriers.

* * * * *